US012401136B2

(12) United States Patent
Formaggi

(10) Patent No.: US 12,401,136 B2
(45) Date of Patent: Aug. 26, 2025

(54) ANTENNA AND ANTENNA SYSTEM FOR SATELLITE COMMUNICATIONS

(71) Applicant: A.D.S. INTERNATIONAL S.R.L., Annone di Brianza (IT)

(72) Inventor: Marco Formaggi, Annone di Brianza (IT)

(73) Assignee: A.D.S. INTERNATIONAL S.R.L., Annone di Brianza (IT)

( * ) Notice: Subject to any disclaimer, the term of this patent is extended or adjusted under 35 U.S.C. 154(b) by 52 days.

(21) Appl. No.: 18/258,428

(22) PCT Filed: Dec. 21, 2021

(86) PCT No.: PCT/EP2021/087008
§ 371 (c)(1),
(2) Date: Jun. 20, 2023

(87) PCT Pub. No.: WO2022/136382
PCT Pub. Date: Jun. 30, 2022

(65) Prior Publication Data
US 2024/0305015 A1 Sep. 12, 2024

(30) Foreign Application Priority Data
Dec. 22, 2020 (IT) ........................ 102020000031799

(51) Int. Cl.
*H01Q 21/24* (2006.01)
*H01P 1/162* (2006.01)
(Continued)

(52) U.S. Cl.
CPC ............. *H01Q 21/24* (2013.01); *H01P 1/162* (2013.01); *H01Q 1/288* (2013.01); *H01Q 13/02* (2013.01);
(Continued)

(58) Field of Classification Search
CPC ........ H01Q 21/24; H01Q 1/288; H01Q 13/02; H01Q 15/24; H01Q 13/0275; H01Q 15/006; H01Q 15/242; H01Q 21/064; H01P 1/162
See application file for complete search history.

(56) References Cited

U.S. PATENT DOCUMENTS 6,650,291 B1 * 11/2003 West ........................ H01Q 5/40 342/371
2012/0218160 A1 * 8/2012 Montgomery ....... H01Q 19/025 29/600
(Continued)

FOREIGN PATENT DOCUMENTS

EP 2493018 A1 8/2012

OTHER PUBLICATIONS

International Search Report and Written Opinion of the ISA for PCT/EP2021/087008 mailed May 3, 2022, 9 pages.
(Continued)

*Primary Examiner* — Dameon E Levi
*Assistant Examiner* — Yonchan J Kim
(74) *Attorney, Agent, or Firm* — NIXON & VANDERHYE P.C.

(57) ABSTRACT

It is disclosed a waveguide array antenna for satellite communications. The antenna is configured to transmit and/or receive a first polarization signal and a second polarization signal, the second polarization being orthogonal to the first polarization, and comprises an array of unit cells, each comprising a radiating element. The antenna comprises: a grid configured to divide each radiating element into sub-elements having an inter-element distance lower than or equal to the wavelength at a highest frequency of operation of the antenna; and an electromagnetic band gap layer configured to support the grid above the radiating elements. The grid comprises a number of grid unit portions,
(Continued)

and the electromagnetic band gap layer consists of a number of pins protruding from the walls of each grid unit portion.

12 Claims, 14 Drawing Sheets

(51) Int. Cl.

| | |
|---|---|
| ***H01Q 1/28*** | (2006.01) |
| ***H01Q 13/02*** | (2006.01) |
| ***H01Q 15/00*** | (2006.01) |
| ***H01Q 15/24*** | (2006.01) |
| ***H01Q 21/06*** | (2006.01) |

(52) U.S. Cl.
CPC ....... *H01Q 13/0275* (2013.01); *H01Q 15/006* (2013.01); *H01Q 15/24* (2013.01); *H01Q 15/242* (2013.01); *H01Q 21/064* (2013.01)

(56) References Cited

U.S. PATENT DOCUMENTS

| | | | | |
|---|---|---|---|---|
| 2015/0188236 | A1* | 7/2015 | Oppenlaender ........ | H01Q 15/24<br>343/893 |
| 2016/0248168 | A1* | 8/2016 | Boyanov .............. | H01Q 21/064 |
| 2017/0256865 | A1* | 9/2017 | Sikes ..................... | H01Q 13/10 |
| 2020/0161735 | A1 | 5/2020 | Kamo et al. | |
| 2023/0344144 | A1* | 10/2023 | Wennergren ......... | H01Q 15/006 |

OTHER PUBLICATIONS

Italian Search Report for IT 102020000031799 dated Sep. 14, 2021, 10 pages.

* cited by examiner

ANTENNA AND ANTENNA SYSTEM FOR SATELLITE COMMUNICATIONS

CROSS-REFERENCE TO RELATED APPLICATIONS

This application is the U.S. national phase of International Application No. PCT/EP2021/087008 filed Dec. 21, 2021, which designated the U.S. and claims priority to IT 102020000031799 filed Dec. 22, 2020, the entire contents of each of which are hereby incorporated by reference.

TECHNICAL FIELD

The present invention relates to the field of antennas and antenna systems for satellite communications. In particular, the present invention relates to the field of waveguide array antennas and systems for satellite communications.

BACKGROUND ART

In SATCOM (Satellite Communications) applications, the demand for higher data rates has recently grown together with the demand for compactness of satellite antennas for the ground terminals. In particular, manufacturers are asked to develop systems capable of addressing wider bandwidth requirements while minimizing the size of the antenna.

In this scenario, waveguide array antennas have gained attention thanks to their aspect ratio and their modular design.

U.S. Pat. No. 6,650,291 B1 discloses a multi-band phased array antenna for radiating low frequency band signals and high frequency band signals. The multiband phased array antenna is formed from unit cells having waveguides for radiating high frequency band signals and end-fire radiating elements for radiating low frequency band signals. The unit cells have four walls with an open input end and an open radiating end. End-fire radiating elements are disposed on inner surfaces and outer surfaces of the four walls and radiate out the radiating end. Four waveguides are disposed together to radiate into the input end of the low frequency assembly.

EP 2 493 018 B1 discloses a mode filter for an antenna having at least one element aperture is provided. The mode filter includes at least one waveguide extension to extend the at least one element aperture, and at least one two-by-two (2×2) array of quad-ridged waveguide sections connected to a respective at least one waveguide extension. When the at least one waveguide extension is positioned between the at least one element aperture and the at least one two-by-two (2×2) array of quad-ridged waveguide sections, undesired electromagnetic modes of the antenna are suppressed.

US 2020/161735 A1 discloses a method of producing a waveguide-to-coaxial adapter array includes applying solder paste to inner surfaces of throughholes of an electrical conductor, inserting coaxial connectors respectively in the throughholes from a first surface of the conductor so that cores of the throughholes respectively become located at the inner surfaces of the throughholes, inserting one or more fixtures including a flat surface in the throughholes from a second surface of the conductor that is opposite to the first surface, so that the flat surface of the fixture(s) contacts the cores of the coaxial connectors and that the cores of the coaxial connectors are held against the inner surfaces of the throughholes, connecting the cores of the coaxial connectors respectively to the inner surfaces of the throughholes by melting the solder paste, and disengaging the fixture(s) from the throughholes.

SUMMARY OF THE INVENTION

As known, in a waveguide array antenna, the radiating element size determines the cut-off frequency of the fundamental mode of propagation (namely, mode TE10 in rectangular waveguides, modes TE10 and TE01 in square waveguides). Hence, in order to allow propagation of the fundamental mode, each radiating element of the antenna must have a size higher than half the wavelength at the lowest frequency of operation. On the other hand, the spacing between two radiating elements must be lower that the wavelength corresponding to the highest frequency of operation, in order to avoid grating lobes. Grating lobes are responsible for radiation into unwanted regions of space which leads to interference between neighbouring satellites.

The inventor noticed that, for the reasons above, as the bandwidth or the separation between transmission and reception sub-bands increases, satisfying both requirements may be complex. An example of satellite communication band where these issues arise is Ka-band, where reception is typically around 20 GHz and transmission is typically around 30 GHz.

More in particular, in standard Ka-band for SATCOM applications, the lowest frequency of the reception sub-band is 19.2 GHZ, while the highest frequency of the transmission sub-band is 31 GHz. Hence, the minimum radiating element size is about 7.8 mm in case of standard waveguide technology and the maximum spacing between two radiating elements is about 9.7 mm. This leaves in practice less than 1 mm of distance between the radiating elements, which, as the inventor noticed, is theoretically feasible but impractical and would result in a more complex and even less compact antenna.

The grating lobes phenomenon is regulated by international standards and by the satellite operators, who typically limit accordingly the amount of EIRP (Effective Isotropic Radiated Power) spectral density radiated by the ground antenna. The presence of higher grating lobes therefore results in lower EIRP spectral density and lower bit/Hz efficiency. In turn, this reduction causes the end user to lease from the satellite operator more bandwidth and therefore to invest more funds to achieve the same satellite link performances.

The Applicant has tackled the problem of providing an antenna for satellite communications, in particular a waveguide array antenna, which allows achieving an efficient usage of the satellite communication bandwidth resources, for instance the Ka-band satellite communication bandwidth, while maintaining a certain degree of compactness and reduced complexity.

According to the present invention, the problem above is solved by an antenna including an array of unit cells, each comprising a radiating element (e.g. a stepped horn), and a grid suitable for dividing each radiating element into a number of radiating sub-elements so as to achieve an inter-element distance that is smaller than or equal to the wavelength at the highest frequency of operation. The grid is advantageously supported over the radiating elements by an electromagnetic band gap (EBG) structure or layer. In other words, the electromagnetic band gap layer is positioned between the radiating elements and the grid above them. The EBG structure or layer is formed by a number of pins.

The electromagnetic band gap layer allows for a broadband or dual band operation; it is designed to support the whole band of operation of the antenna and to prevent radiation outside of the boresight direction. Indeed, the antenna may efficiently operate in wider satellite communication bands or in satellite communications bands with a wider separation between the reception and transmission bandwidth because the grating lobes are advantageously reduced. Also, the antenna compactness is not compromised, nor its complexity is increased. Indeed, the unit cell may be designed with a spacing between the radiating elements which is greater than the wavelength at the highest frequency of operation as the grid is used for splitting the radiating element of the unit cell into a number of radiating sub-elements whose spacing satisfies the condition for the excitation of no grating lobes.

As anticipated above, according to embodiments of the present invention, the antenna components are designed and manufactured in waveguide technology. However, alternatively, one or more components of the antenna may be designed and manufactured in microstrip and stripline technology. A design and manufacturing approach based on waveguide technology offers the advantage of avoiding dielectric materials which typically add losses and may vary their properties from one batch to another causing a shift of the optimal band of operation, which may require the tuning of the assembly by means of, for example, screws or shims.

In the following description and in the claims the expression "waveguide array antenna" will refer to an array antenna comprising components designed and manufactured in waveguide technology. In other words, a "waveguide array antenna" according to the present invention is an array antenna partially or totally made in waveguide technology.

According to a first aspect, the present invention provides a waveguide array antenna for satellite communications, the antenna being configured to transmit and/or receive a first polarization signal and a second polarization signal, the second polarization being orthogonal to the first polarization, and comprising an array of unit cells, each unit cell comprising a radiating element, the antenna further comprising:

- a grid configured to divide each radiating element into a number of radiating sub-elements having an inter-element distance that is lower than or equal to the wavelength at a highest frequency of operation of the antenna; and
- an electromagnetic band gap layer configured to support said grid above the radiating elements, wherein the grid comprises a number of grid unit portions, and the electromagnetic band gap layer consists of a number of pins protruding from the walls of each grid portion.

Preferably, the grid comprises an array of waveguide apertures and each grid unit portion comprises a number of the waveguide apertures to be positioned above a corresponding radiating element.

Preferably, each waveguide aperture has a quadridged (i.e. quadruple ridged) shape.

According to embodiments of the present invention, each unit cell further comprises a mode filter connected to the radiating element, the mode filter being located below the radiating element and being configured to pass a fundamental mode of propagation of the first polarization signal and of the second polarization signal and to reject higher order modes of propagation.

According to these embodiments of the present invention, the mode filter is configured to reject higher order modes of propagation with simultaneous E or H plane symmetry on two orthogonal planes of the first polarization signal and of the second polarization signal before they reach the radiating element from a feeding waveguide. The expression "higher order modes of propagation with simultaneous E or H plane symmetry on two orthogonal planes" indicates higher order propagation modes for which the electric field (E) or the magnetic field (H) is symmetric with respect to two orthogonal symmetry planes at the same time. The feeding waveguide is a waveguide located below the radiating element, which feeds the radiating element. In particular, in case of a square feeding waveguide, the mode filter is configured to reject TE11 and TM11 modes of propagation of the first polarization signal and of the second polarization signal.

Preferably, the mode filter comprises a center portion and two end portions at the two sides of the center portion, wherein the center portion is a waveguide having a cross section with a Malta Cross shape, and wherein each of the end portions is a square waveguide comprising hollow cylindrical (which may be called also "mouse ear shaped") elements at its corners.

Preferably, the radiating element is a stepped horn.

According to embodiments of the present invention, the antenna further comprises a first diplexer and a second diplexer, the first diplexer being configured to separate a first polarization transmission signal and a first polarization reception signal and the second diplexer being configured to separate a second polarization transmission signal and a second polarization reception signal, the waveguide array antenna further comprising one or more beamforming networks connecting the first and second diplexers with the unit cells.

According to embodiments of the present invention, each unit cell further comprises a polarizer, the polarizer being a septum polarizer or an orthomode polarizer.

According to other embodiments, the antenna further comprises a discrete polarizer interposed between the first and second diplexers and one or more beam forming networks.

According to even further embodiments, the antenna comprises a distributed aperture polarizer positioned above the grid.

Preferably, the antenna is configured to operate between 19.2 GHz and 21.2 GHz in reception and between 29 GHz and 31 GHz in transmission.

Preferably, the antenna is manufactured as a layered assembly comprising a radiating layer comprising the radiating elements and a grid layer comprising the grid and the electromagnetic band gap structure. Preferably, the layers are made of metal by using a computerized numerical control machining technology. The metal may be, for example, aluminium, copper or magnesium alloy. Alternatively, one or more of the layers are made of metalized plastic, or 3D printed metal, or cast metal.

According to a second aspect, the present invention provides an antenna system for satellite communications, the system being configured to be installed at a fixed location or on a land vehicle or on a vessel or on an aircraft, the system comprising a waveguide array antenna as set forth above, a radome, a positioner and a housing for an antenna control unit.

BRIEF DESCRIPTION OF THE DRAWINGS

The present invention will become clearer from the following detailed description, given by way of example and not of limitation, to be read with reference to the accompanying drawings, wherein.

DETAILED DESCRIPTION OF PREFERRED EMBODIMENTS OF THE INVENTION

In the present description and claims, unless otherwise specified, all the numbers and values should be intended as preceded by the term "about".

Figure 1A:
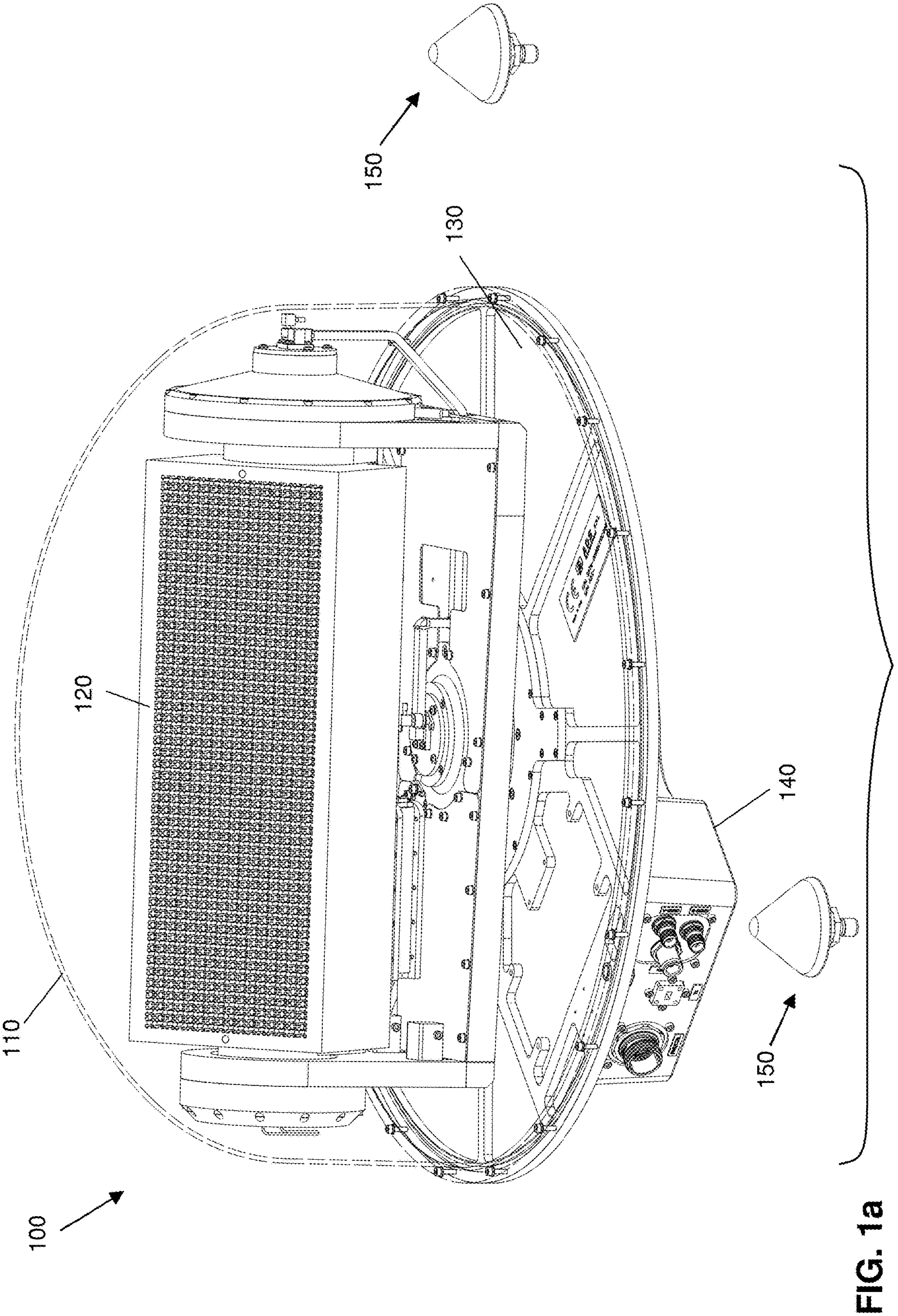
FIGS. 1*a* and 1*b* are two schematic views of an antenna system according to an embodiment of the present invention.
Figure 1B:
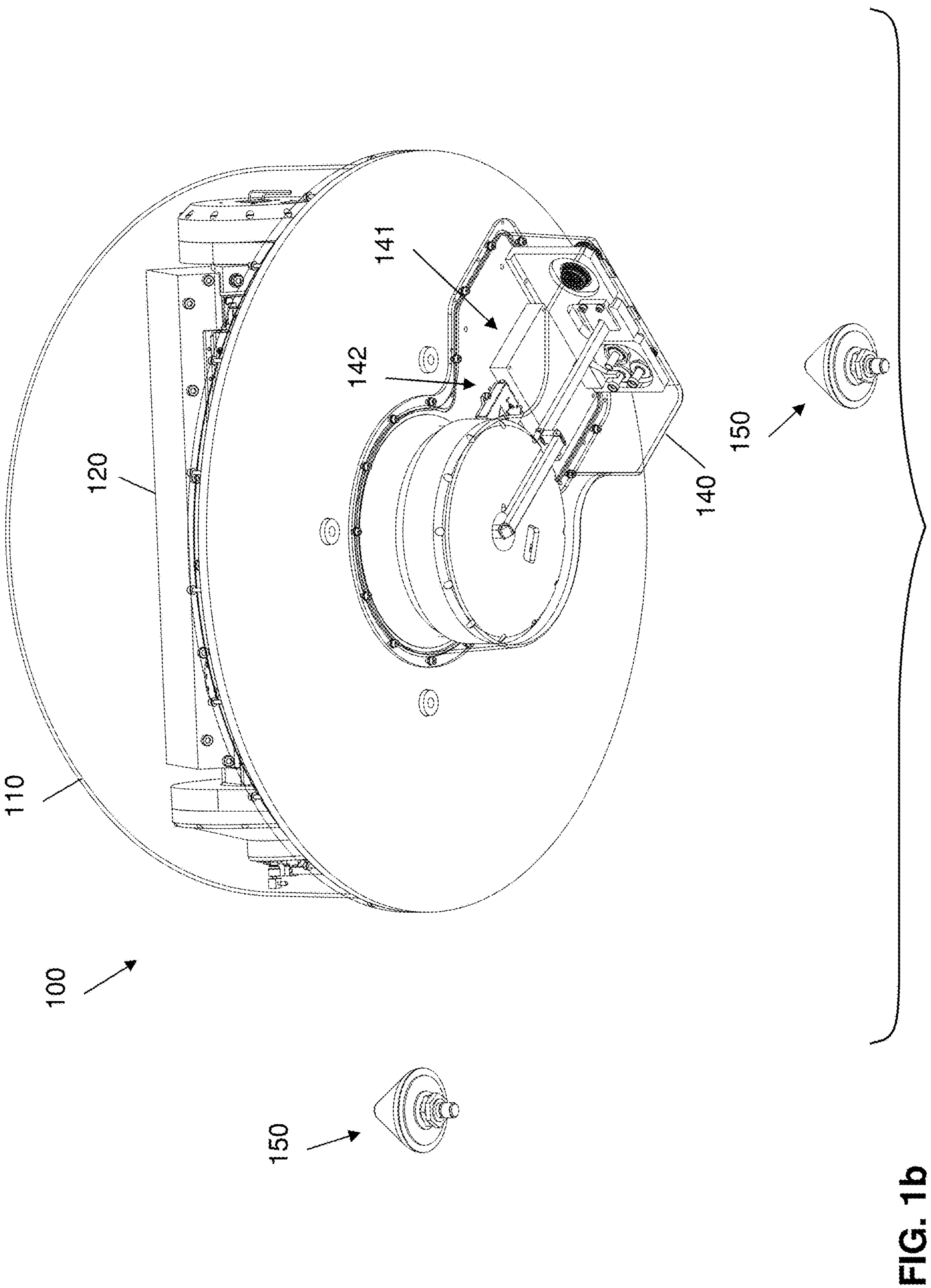

FIGS. 1*a* and 1*b* are two views of an antenna system 100 for two-way satellite communications in accordance with embodiments of the present invention.

The antenna system 100 may be configured to communicate with a geostationary orbit satellite (GEO) or a non-geostationary orbit satellite (e.g. low earth orbit, LEO, or medium earth orbit, MEO). The antenna system 100 may be installed at a fixed location, on a land vehicle, on a vessel or on an aircraft. The antenna system 100 includes a radome 110, an antenna 120, in particular a waveguide array antenna, a positioner 130 and a housing 140 for an antenna control unit (ACU) 141. The housing 140 may also house sensors providing attitude and heading information, such as an attitude heading reference system (AHRS) 142.

The ACU 141 may receive information on the strength of a received radiofrequency (RF) signal for example from a beacon receiver, a tracking receiver or a modem and use such information to optimise satellite pointing. The AHRS 142 typically embeds gyroscopes and accelerometers and may cooperate with one or two GNSS antennas 150 to estimate the direction of true north, which is then used to accurately point to the satellite. The positioner 130 may include rotary joints and sliprings and may have two or more degrees of freedom and implement direct drive servo motors and absolute digital encoders. Additionally suitable RF switches, low noise amplifiers (LNA) or low noise block-down converters (LNB) and power amplifier (PA) or block up converter (BUC) may be connected to the antenna and/or system ports.

The structure and functioning of the positioner, the ACU, the AHRS, LNA, LNB, PA and BUC is known and is not relevant to the present invention; hence these components will not be further discussed herein below.

The antenna 120 may be configured to operate in the Ka frequency band, in particular in the range between 17.3 GHZ and 31 GHZ, for instance between 19.2 GHz and 21.2 GHz in reception and between 29 GHz and 31 GHz in transmission.

According to first embodiments of the present invention, the antenna 120 preferably comprises an array of unit cells, each comprising a radiating element, and a grid positioned above the radiating elements. The grid is supported over the radiating elements by an electromagnetic band gap (EBG) structure or layer. In other words, the EBG structure or layer is positioned between the radiating elements and the grid. According to second embodiments of the present invention, the antenna 120 preferably comprises an array of unit cells, each comprising a radiating element and a mode filter, and a grid positioned above the radiating elements, supported by an EBG structure.

Furthermore, the antenna 120 may comprise a polarizer, e.g. in the form of a distributed element polarizer (namely, the antenna may comprise a respective polarizer in each unit cell).

The antenna 120 may further comprise one or more diplexers for separating the transmission and reception signals, and one or more beamforming networks connecting the diplexer(s) to the unit cells.

According to the present invention, the antenna components can be designed and manufactured in waveguide technology. According to other embodiments, it may also include components designed and manufactured in microstrip and stripline technology. As already mentioned above, such approach based on waveguide technology has the advantage of avoiding dielectric materials which add losses and may vary their properties from one batch to another, potentially requiring the tuning of the assembly.

The grid is suitable for dividing each radiating element into a number of radiating sub-elements so as to achieve an inter-element distance that is lower than or equal to the wavelength at the highest frequency of operation. In particular, the grid is preferably designed to achieve an inter-element distance $d_e$ as follows:

$$d_e \leq \alpha \times \lambda$$

where α is a multiplicative factor equal to a value within the range between 0.8 and 1 and λ is the wavelength corresponding to the highest frequency of operation. More preferably, factor α has a value within the range 0.8-0.9. For instance, considering the highest frequency of operation of 31 GHz mentioned above and α=0.8, the inter-element distance $d_e$ may be equal to 7.75 mm. The grid is supported above the radiating elements by an electromagnetic band gap (EBG) structure. The grid and the EBG structure will be better described herein after.

The mode filter is capable of suppressing higher order modes which may be excited and propagate (in particular, for the standard Ka-band mentioned above, in the transmission sub-band) and which may increase the grating lobes and cross polarization interference. Indeed, typically, square, or circular, waveguides are used for feeding the radiating elements. Quadridged waveguides may also be used. In particular, square, or circular, waveguides are typically used in, e.g., the polarizers to propagate the fundamental mode (namely, TE01, TE10 in square waveguides) of the dual polarization signals, and, as known, they may also support higher order modes (e.g. TE11 and TM11 in square waveguides) in case the band of operation is wide or in case of large separation between the transmission and reception sub-bands. In particular, in standard Ka-band, for a square waveguide supporting the propagation of the fundamental mode at 19.2 GHZ (i.e. at the lowest frequency of the reception sub-band), the higher order modes cut on at about 27.2 GHz and hence they may propagate in the transmission sub-band. The skilled person will appreciate that the same issue arises in case of any other waveguide section that may support two orthogonal fundamental modes of propagation. The mode filter of the present invention is specifically designed to filter the higher order modes with simultaneous E or H plane symmetry on two orthogonal planes that may reach the radiating element from a feeding waveguide. The higher order modes rejected by the mode filter of the present invention are, in particular, modes TE11 and TM11 in case of a square waveguide. In case a circular (or a circular quadridged) waveguide is used for feeding the radiating element, the mode filter may be designed to reject modes TM01 and TE21. In case a square quadridged waveguide is used, the mode filter may be configured to reject modes TE11 and TE20.

The mode filter structure will be better described herein after.

It is to be noticed that, although in the present description embodiments are described in which the unit cell of the array comprises a radiating element, according to other embodiments of the present invention not described in detail herein after, each unit cell may comprise more than one radiating element.

Figure 2:
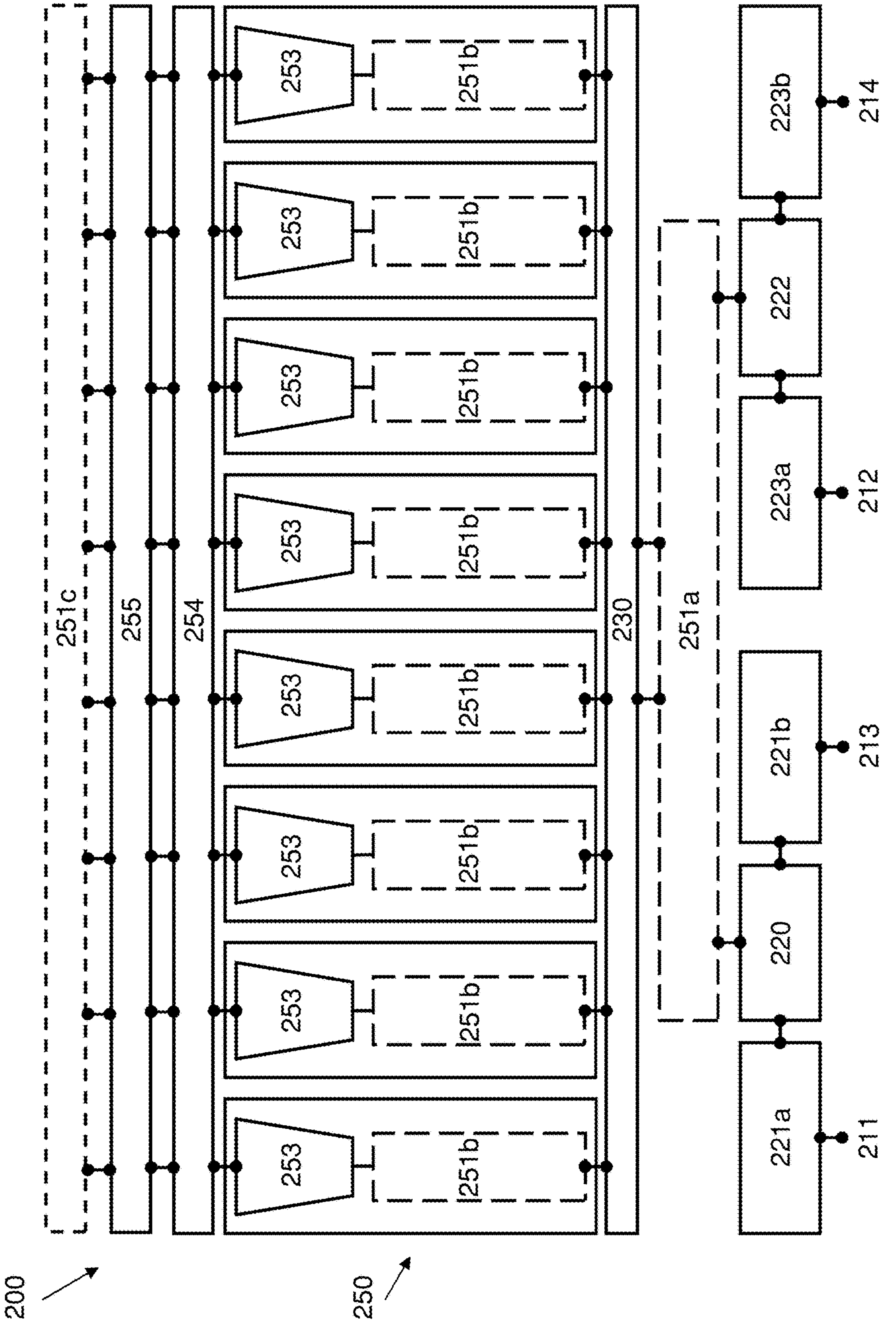
FIG. 2 is a block scheme of an antenna according to first embodiments of the present invention.

FIG. 2 shows a block scheme of an antenna 200 according to first embodiments of the present invention. The block scheme of FIG. 2 may represent a dual polarized waveguide array antenna suitable for being employed in the system of FIG. 1. In particular, the antenna may support transmission and reception of two signals in two independent polarizations, namely a first polarization and a second polarization, wherein the second polarization is orthogonal to the first polarization. For example, the first polarization may be a left hand circular polarization (LHCP) and the second polarization may be a right hand circular polarization (RHCP). According to the scheme shown in FIG. 2, the antenna 200 may comprise two diplexers 220, 222. Each diplexer 220, 222 may comprise two filters, e.g. a receive reject filter 221*a*, 223*a* and a transmit reject filter 221*b*, 223*b*. Each receive reject filter is used to provide rejection in the reception band while each transmit reject filter is used to provide rejection in the transmission band. The two diplexers 220, 222 have four interface ports: a first port 211 for transmission of a first polarization signal, a second port 212 for transmission of a second polarization signal, a third port 213 for reception of the first polarization signal, and a fourth port 214 for reception of the second polarization signal. The two diplexers 220, 222 may be connected to one or more beam forming networks 230. The beam forming network(s) are connected to an array of unit cells 250. For instance, the antenna 200 may comprise two beam forming networks, one respective beam forming network for each polarization. In this case, each beam forming network may implement beamforming in both azimuth and elevation planes. FIG. 2 shows, for sake of non-limiting example, eight unit cells 250. Each unit cell includes a radiating element 253. The radiating element may be for instance a stepped horn. The antenna 200 then preferably comprises the grid 255, which, as already mentioned above, is supported above the radiating elements by an EBG structure 254.

According to variants of such first embodiments of the present invention, the antenna 200 preferably also comprises a polarizer. The block representing the polarizer in FIG. 2 is a dashed box.

In particular, according to first variants, the polarizer may be a discrete polarizer 251*a* interposed between the optional diplexers 220, 222 and the beam forming network(s). In this case, the discrete polarizer 251*a* may be a 3 dB hybrid element.

Alternatively, according to second variants, the polarizer may be a distributed element polarizer 251*b*. In this case, each unit cell 250 comprises a respective polarizer element, such as a septum polarizer or an orthomode polarizer, interposed between the beam forming network(s) and the radiating element.

As known, a septum polarizer is a three port waveguide component comprising two rectangular ports, where the signals associated with two orthogonal linear polarizations propagate in the form of TE10 modes, and a common square port, where the signals associated with two circular polarizations propagate in the form of TE10 and TE01 orthogonal fundamental modes. The transition from the two rectangular waveguides into the single square waveguide is achieved by means of a bisecting wall, called "septum", which generates a differential phase shift between the two fundamental modes in the square waveguide. The septum is asymmetrical and may have a continuous or stepped shape over its length.

In further alternative, according to third variants, the polarizer may be a distributed aperture polarizer 251*c*. In this case, the polarizer 251*c* is positioned above the grid 255. Examples of distributed aperture polarizers are meander line polarizers, grid polarizers, parallel plate polarizers, and so on.

Figure 3:
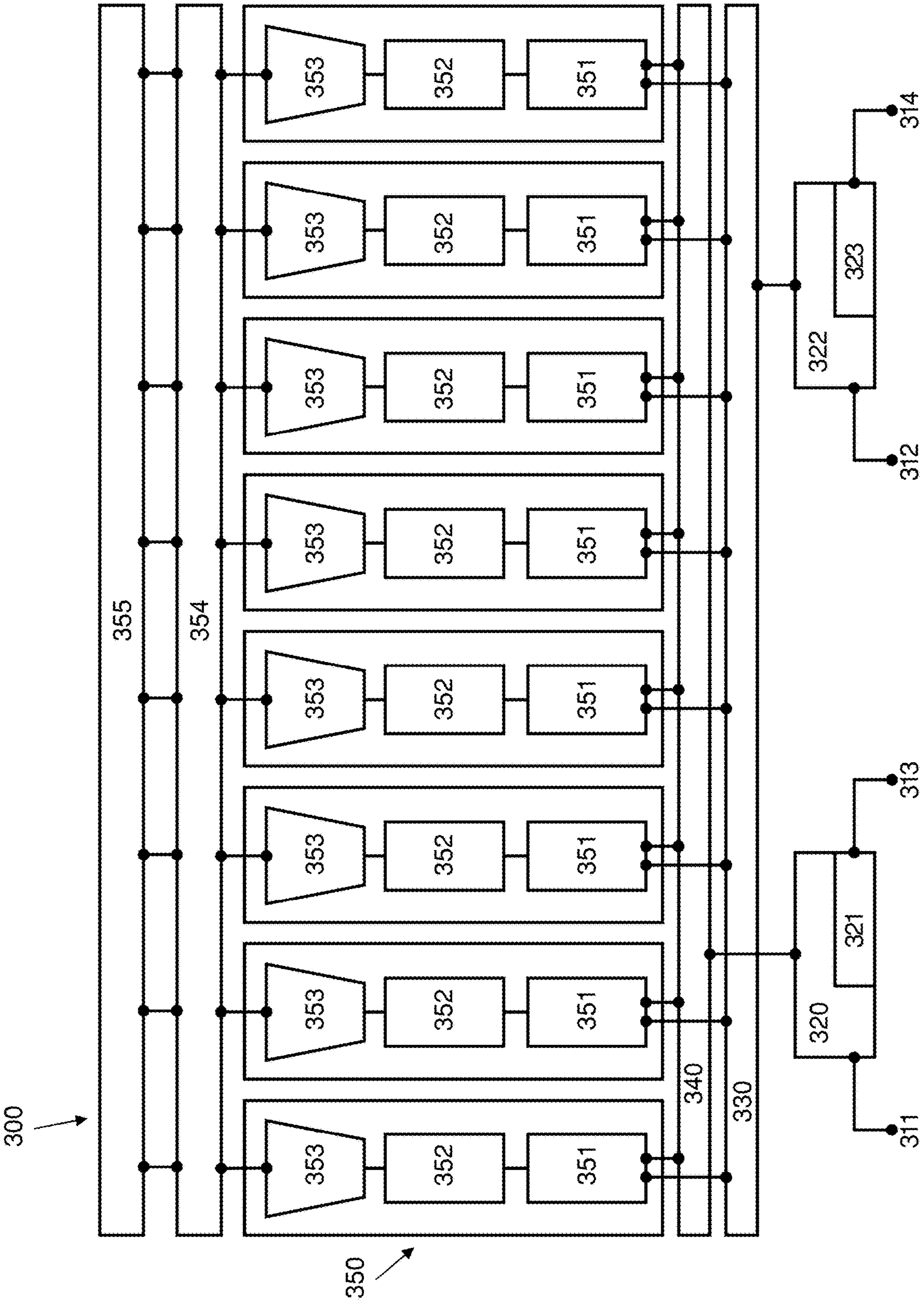
FIG. 3 is a block diagram of an exemplary antenna according to second embodiments of the present invention.

FIG. 3 shows a block diagram of an exemplary antenna 300 in accordance with second embodiments of the present invention. According to these embodiments, the antenna comprises a grid above the radiating elements, as already described above, and each radiating element is connected to a respective mode filter located below the radiating element.

The block scheme shown in FIG. 3, in particular, may represent a dual polarized waveguide array antenna suitable for being employed in the system of FIG. 1. In particular, the antenna 300 may be a circularly polarized antenna. The exemplary antenna 300 comprises two diplexers 320, 322, each optionally comprising a filter 321, 323, in particular a waveguide transmit reject filter. The two diplexers 320, 322 have four interface ports: a first port 311 for transmission of the first polarization signal, namely, for instance a left hand circular polarization (LHCP) signal, a second port 312 for transmission of the second polarization signal, namely, for instance, a right hand circular (RHCP) signal, a third port 313 for reception of the first polarization signal, and a fourth port 314 for reception of the second polarization signal.

The two diplexers 320, 322 are connected respectively to a first beam forming network 330 and to a second beam forming network 340, each one implementing beamforming in both azimuth and elevation planes respectively for the first and second polarization signals. The first beam forming network 330 and the second beam forming network 340 are connected to an array of unit cells 350. FIG. 3 shows, for sake of non-limiting example, eight unit cells 350. Each unit cell includes a polarizer 351, e.g. in the form of a septum polarizer, a mode filter 352, and a radiating element 353, e.g. in the form of a stepped horn. The antenna 300 then preferably comprises a grid 355. The grid 355 is supported above the radiating elements 353 by an EBG structure 354.

Figure 4A:
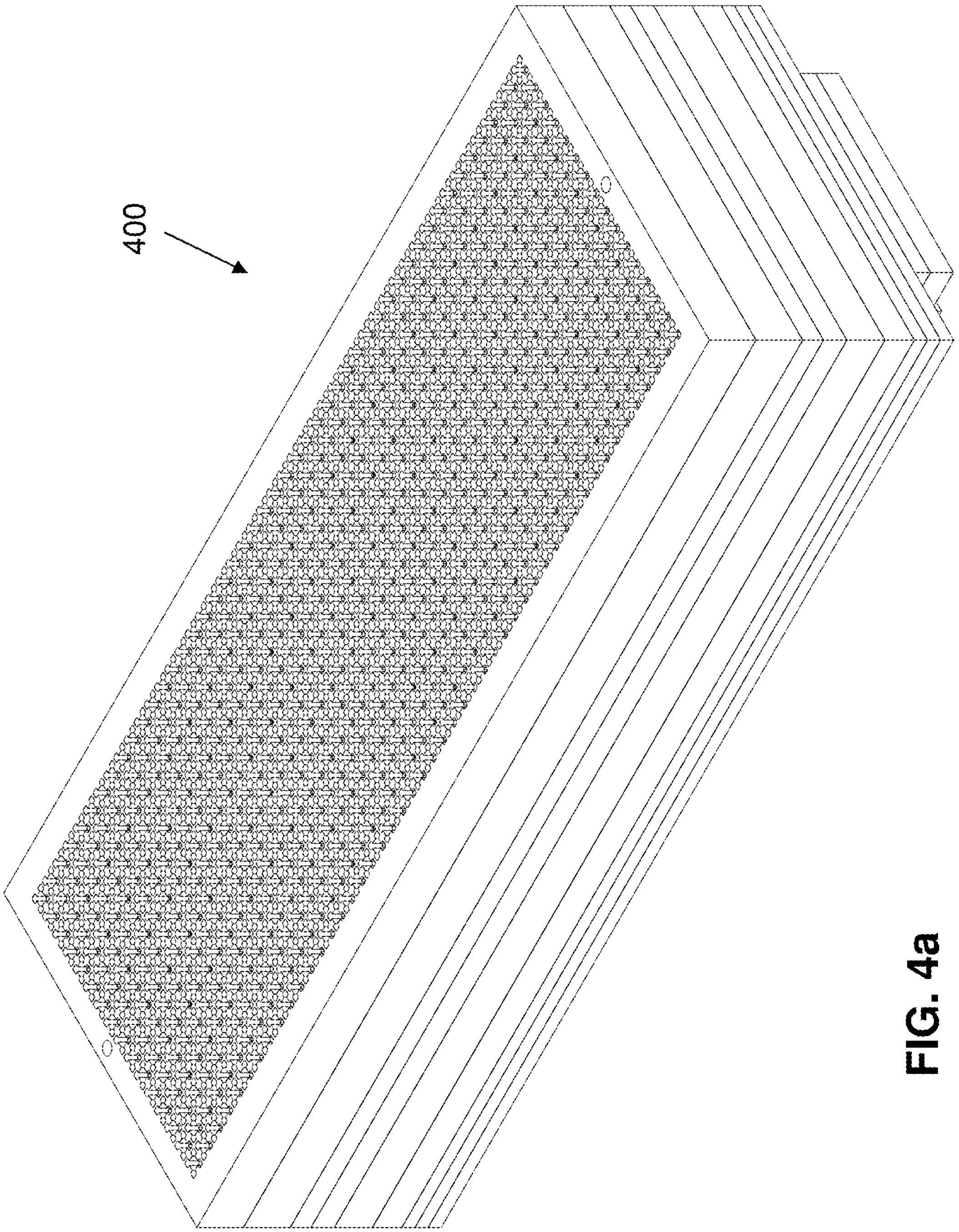
FIGS. 4*a* and 4*b* schematically show assembled views of a layered assembly for the antenna according to embodiments of the present invention.
Figure 4B:
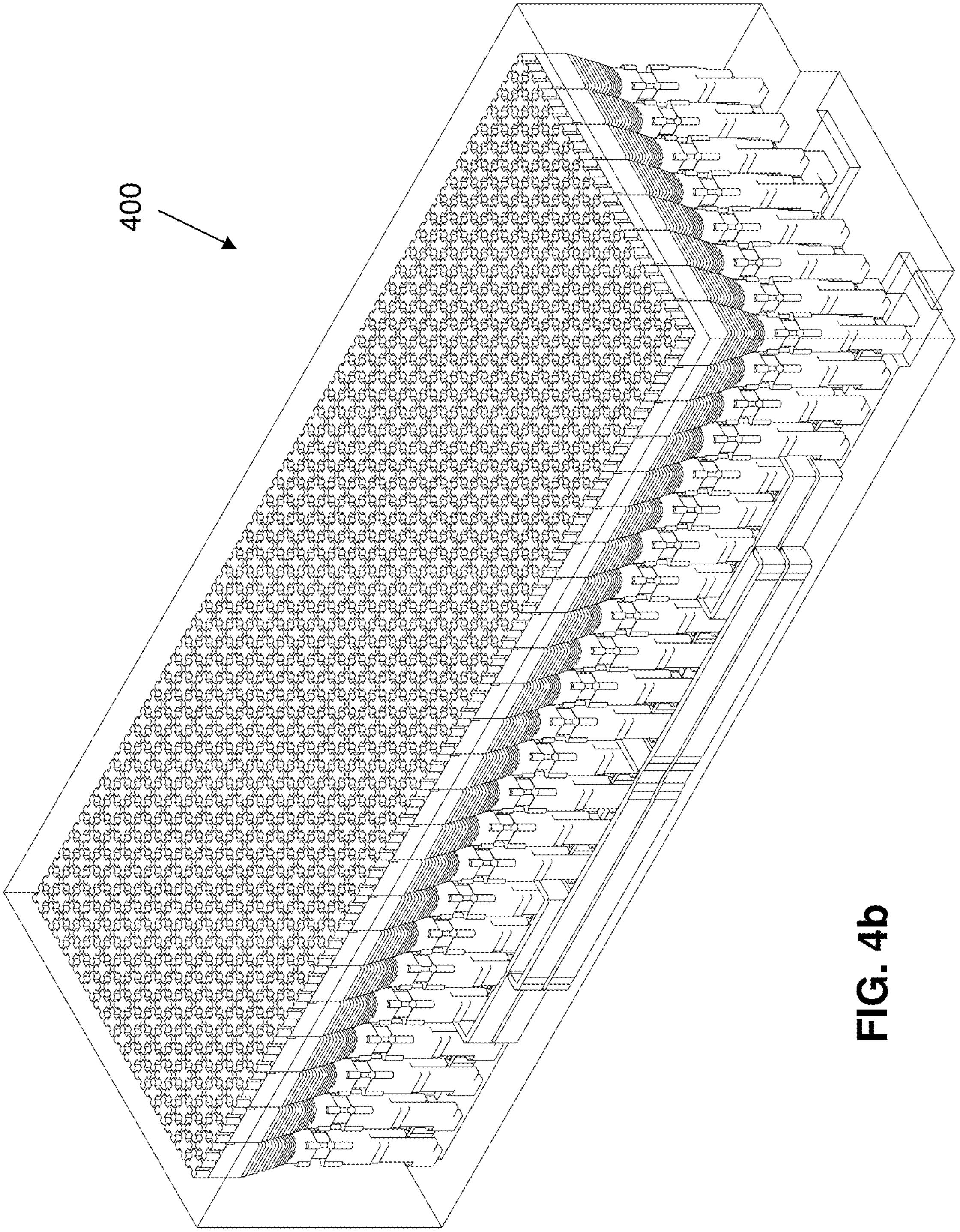

FIGS. 4*a* and 4*b* are two views of an example of a layered assembly for a waveguide array antenna 400 in accordance with the embodiments of the present invention schematically represented in FIG. 3. The layers are preferably made of metal by using a CNC (Computerized Numerical Control) machining technology. The metal may be, for instance, aluminium, copper or magnesium alloy. Alternatively, one or more of the layers of the assembly may be made of metalized plastic, or 3D printed metal, or cast metal.

Figure 5A:
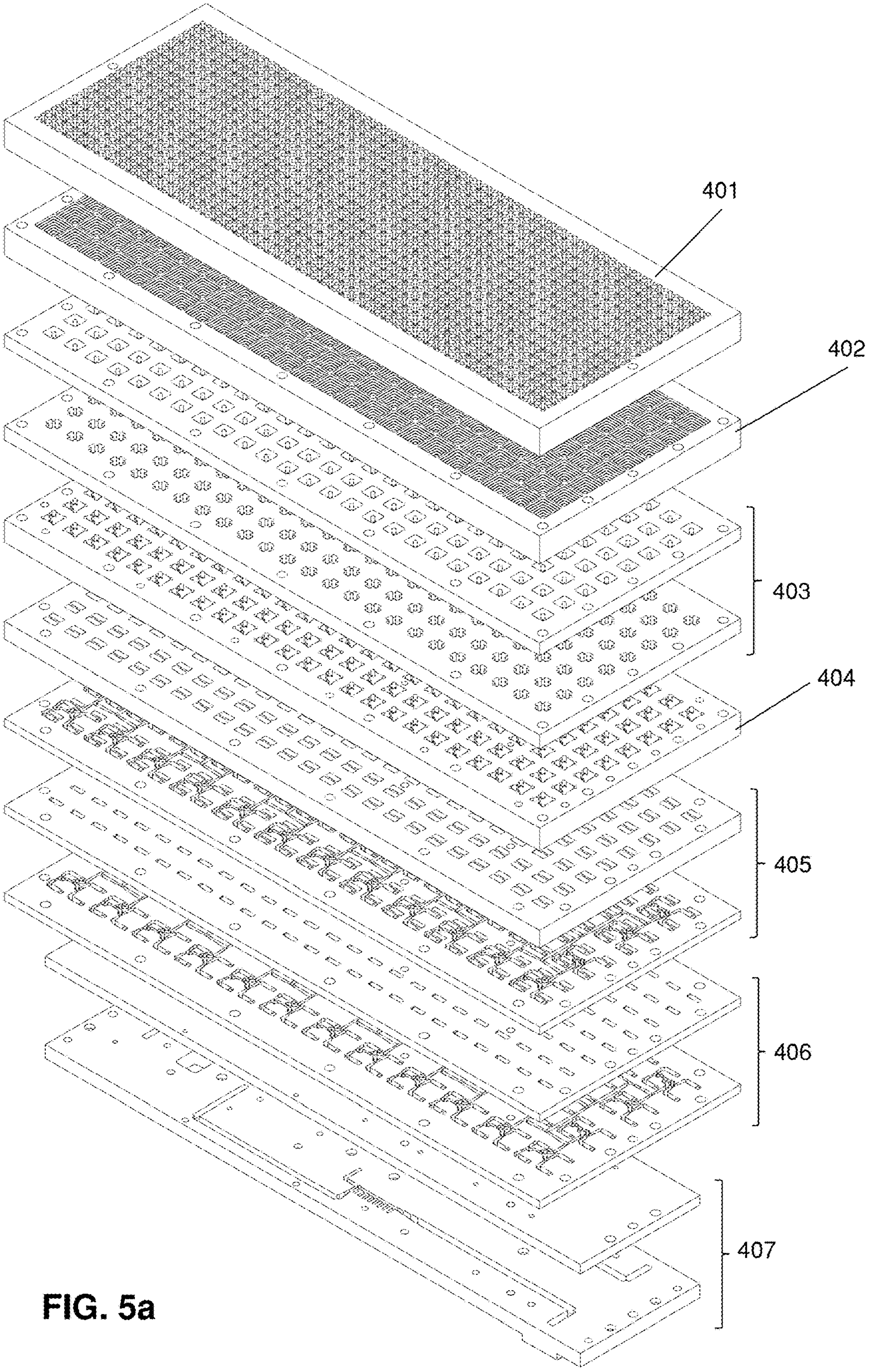
FIGS. 5*a* and 5*b* show exploded views of the layered assembly of FIGS. 4*a* and 4*b*.
Figure 5B:
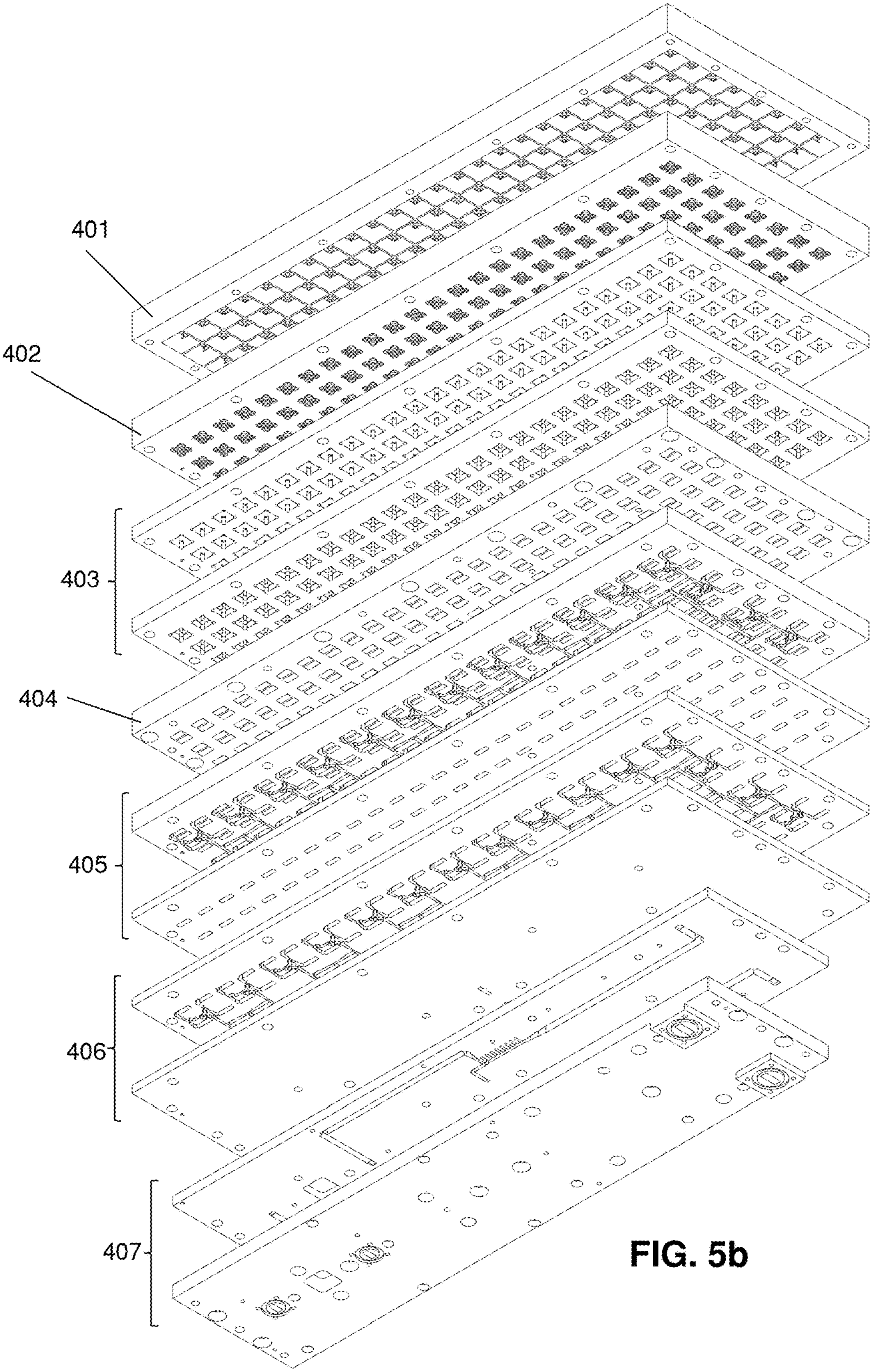

FIGS. 5*a* and 5*b* are two exploded views (respectively, from the top and from the bottom) of the layered assembly for the dual polarised waveguide array antenna 400 shown in FIGS. 4*a* and 4*b*. According to these embodiments, the antenna 400 comprises:

- a grid layer 401 (in particular, according to these embodiments, this layer comprises a grid supported by an EBG structure);
- a radiating layer 402 comprising the radiating elements of the unit cells in the form of, in particular, stepped horns;
- two mode filter half-layers 403 comprising the mode filters of the unit cells;
- a polarizer layer 404 comprising the polarizers, in particular the septum polarizers, of the unit cells;
- two BFN half-layers 405 comprising the beam forming network for the first polarisation;
- two BFN half-layers 406 comprising the beam forming network for the second polarisation; and
- two diplexer half-layers 407 comprising the two diplexers.

It is to be noticed that the radiating layer 402 preferably comprises radiating elements in the form of horns with a stepped structure (as shown in FIG. 4*b*) and a quadridged input waveguide (as shown in FIG. 5*b*), for increasing the bandwidth of operation.

It is to be noticed that, according to these embodiments, optimal alignment of all the layers is required to minimise return loss and insertion loss and may be ensured by means of dowel pins. Moreover, optimal electric contact between all adjacent layers is required to avoid spillover from the waveguide walls and therefore minimise losses. This may be ensured by distributing the screws and fixing points throughout the whole surface of the layers.

Moreover, it can be noticed that, for manufacturing reasons, the grid layer may comprise the last portion of the radiating layer below, e.g. the last portion of the stepped horn radiating elements.

Figure 6A:
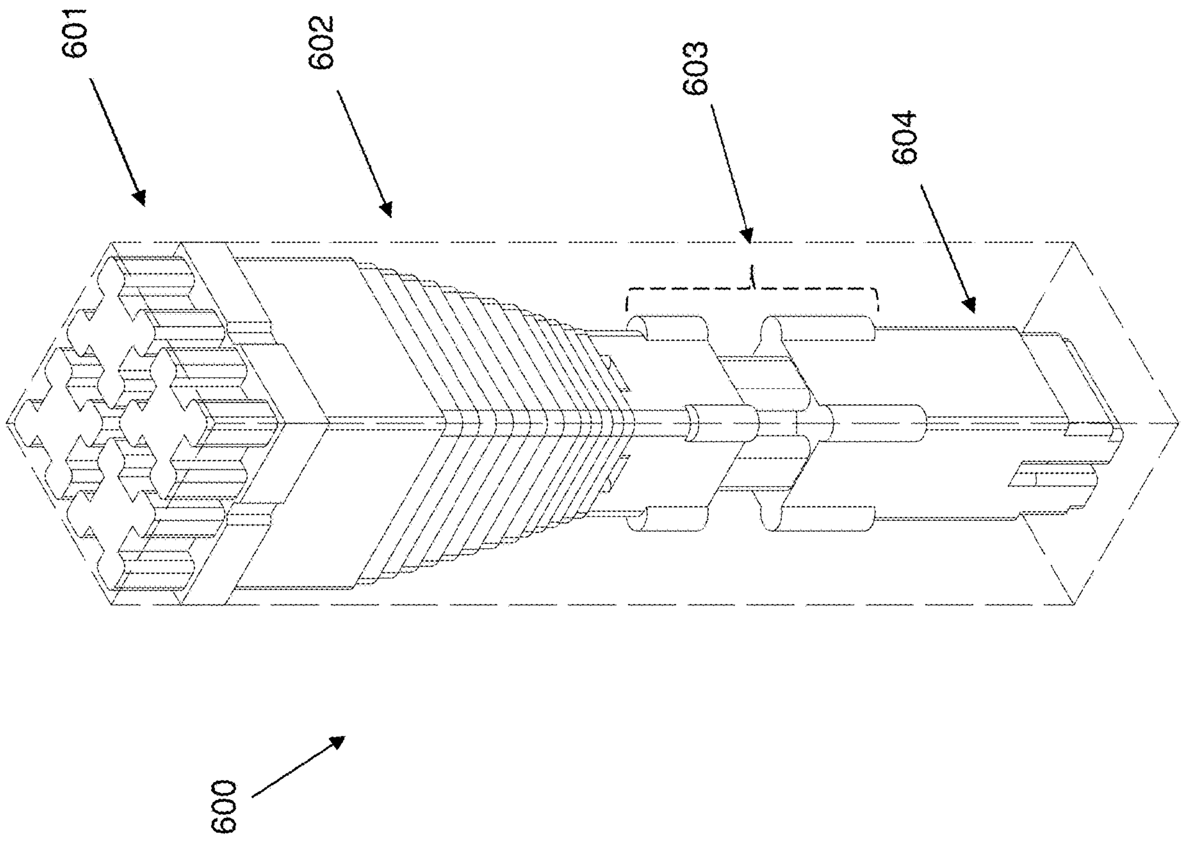
FIG. 6*a* schematically shows a unit cell of the antenna and a unit portion of the grid according to an embodiment of the present invention.
Figure 6B:
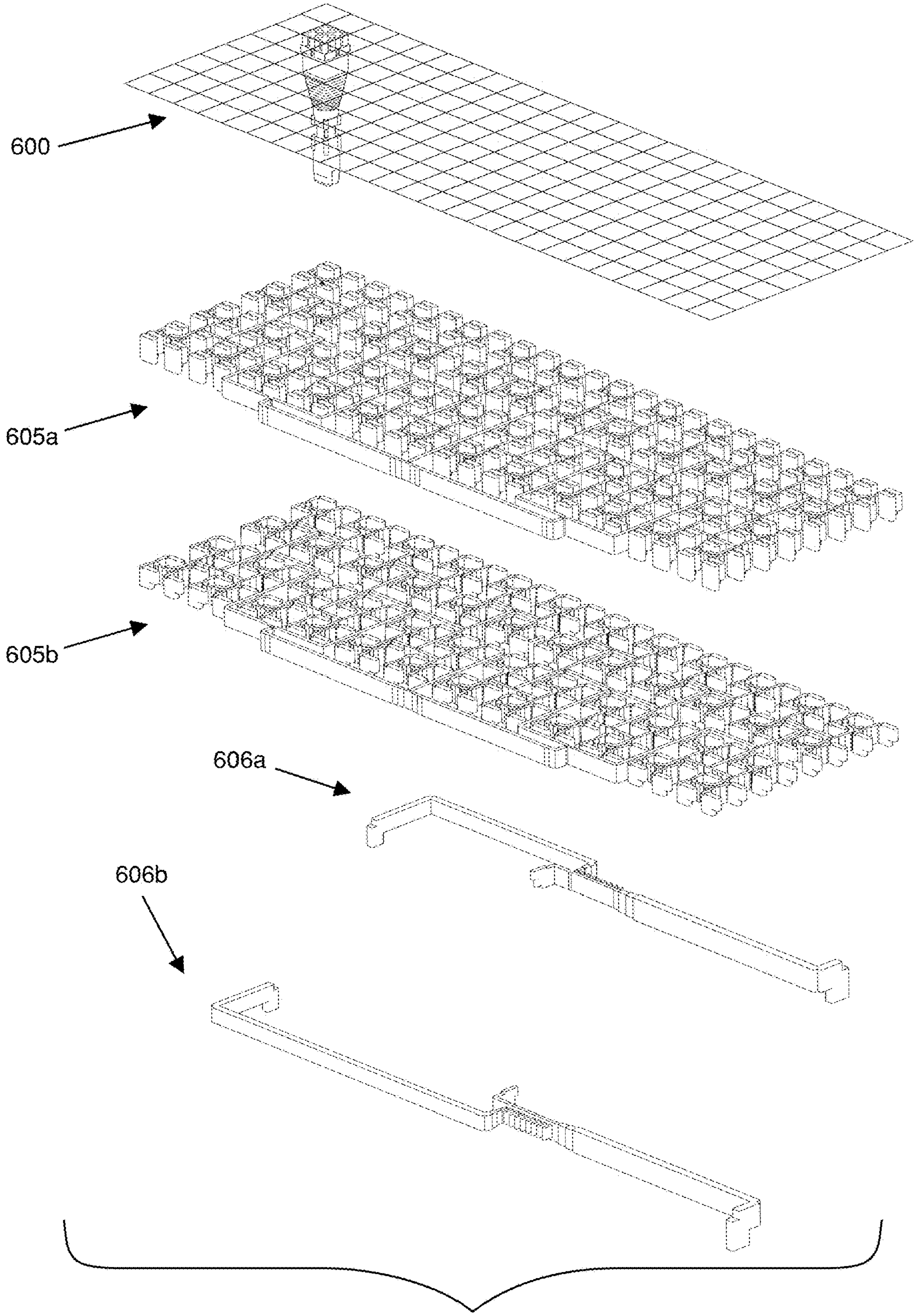
FIG. 6*b* shows the unit cell, the beam forming networks and the diplexers of the antenna according to an embodiment of the present invention.
Figure 9B:
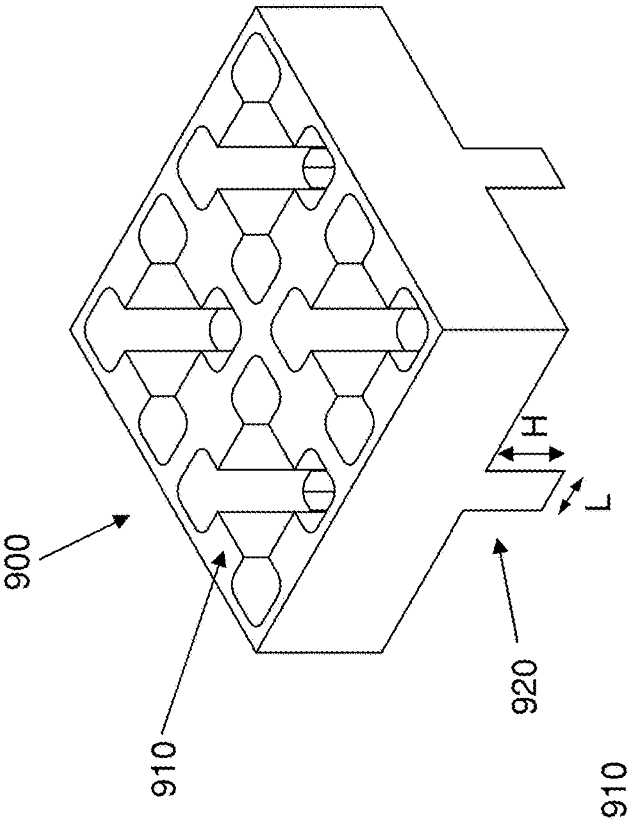
FIGS. 9*a*, 9*b* and 9*c* show a unit portion of a grid for the antenna of the present invention.
Figure 9C:
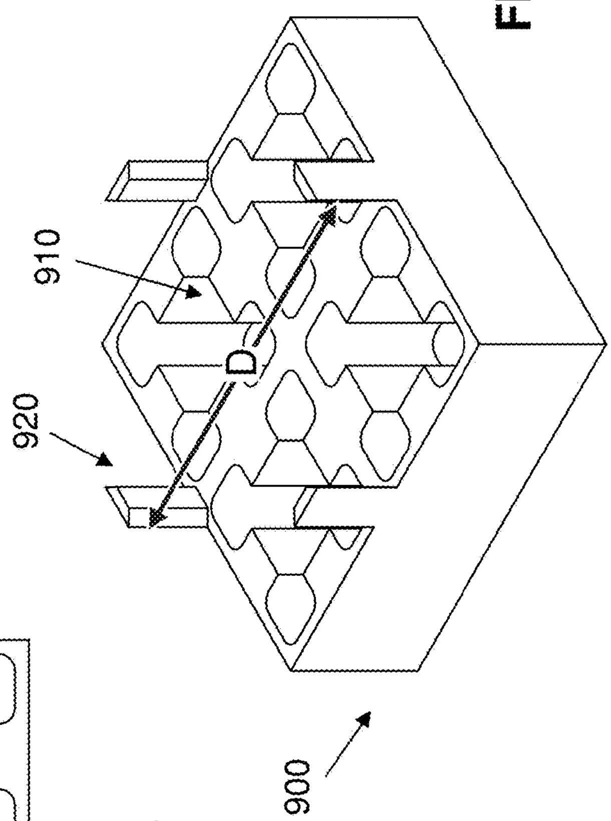
Figure 9A:
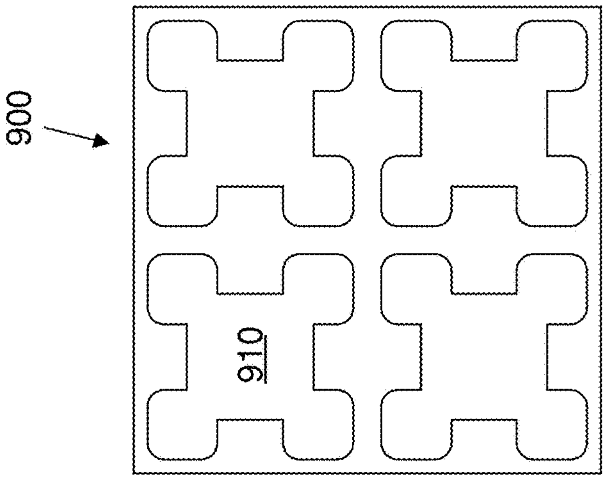

FIG. 6*a* schematically shows a unit cell 600 and a unit portion 601 of the grid layer 401 shown in FIGS. 5*a* and 5*b* (this unit portion is shown in more detail in FIGS. 9*a*, 9*b* and 9*c*). The unit cell 600 comprises a unit portion 602 of the radiating layer 402 (namely, a single stepped horn), a unit portion 603 of the two mode filter half-layers 403 (namely a single mode filter, which will be shown in more detail in FIGS. 7*a* and 7*b*), and a unit portion 604 of the polarizer layer 404 (namely, a single septum polarizer). FIG. 6*b* shows the unit cell 600, the beam forming networks 605*a*, 605*b* comprised in the BFN half-layers 405, 406 and the diplexers 606*a*, 606*b* comprised in the diplexer half-layers 407 of the layered assembly of FIGS. 5*a* and 5*b*.

Figure 7B:
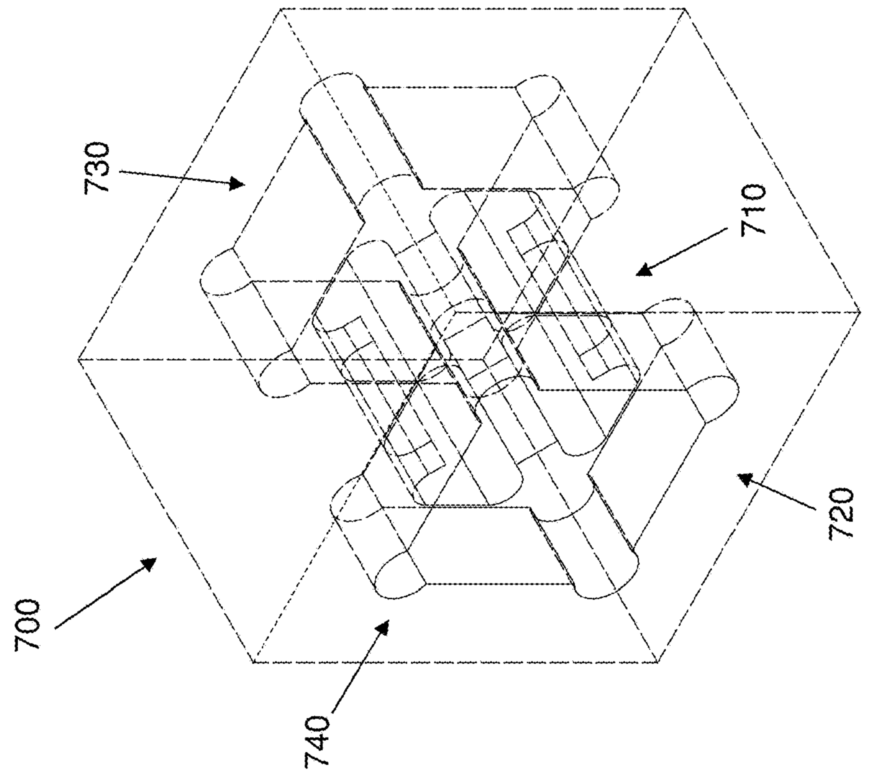
FIGS. 7*a* and 7*b* show a mode filter for the antenna according to an embodiment of the present invention.
Figure 7A:
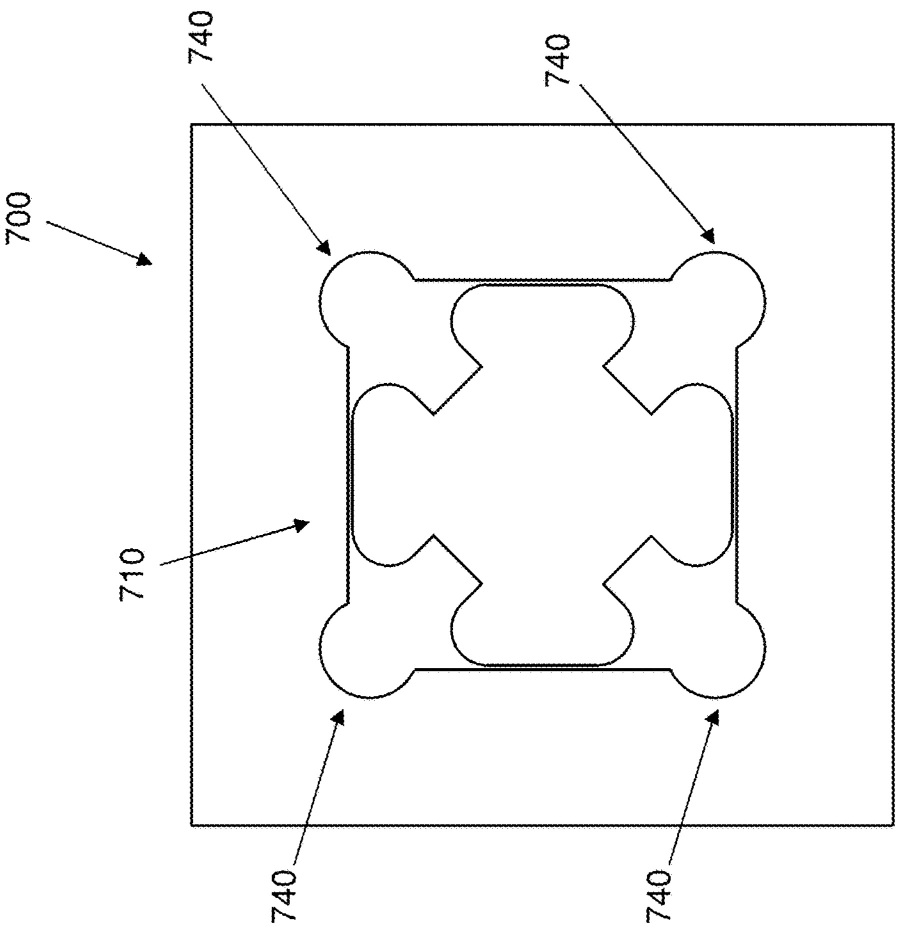

FIGS. 7*a* and 7*b* show, respectively, a top view and a isometric view of a waveguide mode filter 700 in accordance with embodiments of the present invention.

According to the present invention, the mode filter comprised in each unit cell includes a center portion 710 and two end portions 720, 730 at the two sides of the center portion. All these portions are preferably realized in waveguide technology. In particular, the waveguides may have a substantially square cross section or circular cross section, or any other cross section shape that may support two orthogonal fundamental modes of propagation.

The center portion 710 preferably has a length equal to about half the wavelength at a frequency corresponding to the center of the operational bandwidth. The cross section of the center portion 710 has a shape suitable for achieving the reflection of the higher order modes. Such a shape may be, for instance, the Malta Cross shape shown in FIGS. 7*a* and 7*b*. This corresponds to the cross section of a quadridged waveguide which is rotated by 45° with respect to the square cross section of the end portions 720, 730 and with respect to the square cross section of the waveguide at the output of the septum polarizer. This particular shape has the advantage of filtering unwanted higher order modes (and in particular those that may be generated by the septum polarizer in the transmission sub-band, such as in the case of Ka-band). In particular, this shape allows filtering the unwanted higher order modes with simultaneous E or H plane symmetry on two orthogonal planes. It is to be noticed that the mode filter may have any other shape having the function of reflecting higher order modes with said symmetry, while minimising the effect on the fundamental mode. For instance, it may comprise a dielectric-supported dipole located at the center of the waveguide and directed along the propagation axis.

Each of the end portions 720, 730 of the mode filter 700 is preferably in the form of a square waveguide. Each end portion 720, 730 is designed to modify the propagation constant of the higher order modes while leaving unmodified the propagation constant of the fundamental mode. This is achieved, for example, by adding hollow cylindrical (which may be called also "mouse ear shaped") elements 740 at the corners of the end portions. These elements are used to widen the band of the fundamental waveguide mode. These elements advantageously allow shifting outside of the bandwidth of operation any resonance of the higher order modes that are reflected in the center portion. The end portions may alternatively be in the form of ridged or quadridged waveguide elements, with the same function mentioned above.

Figure 8A:
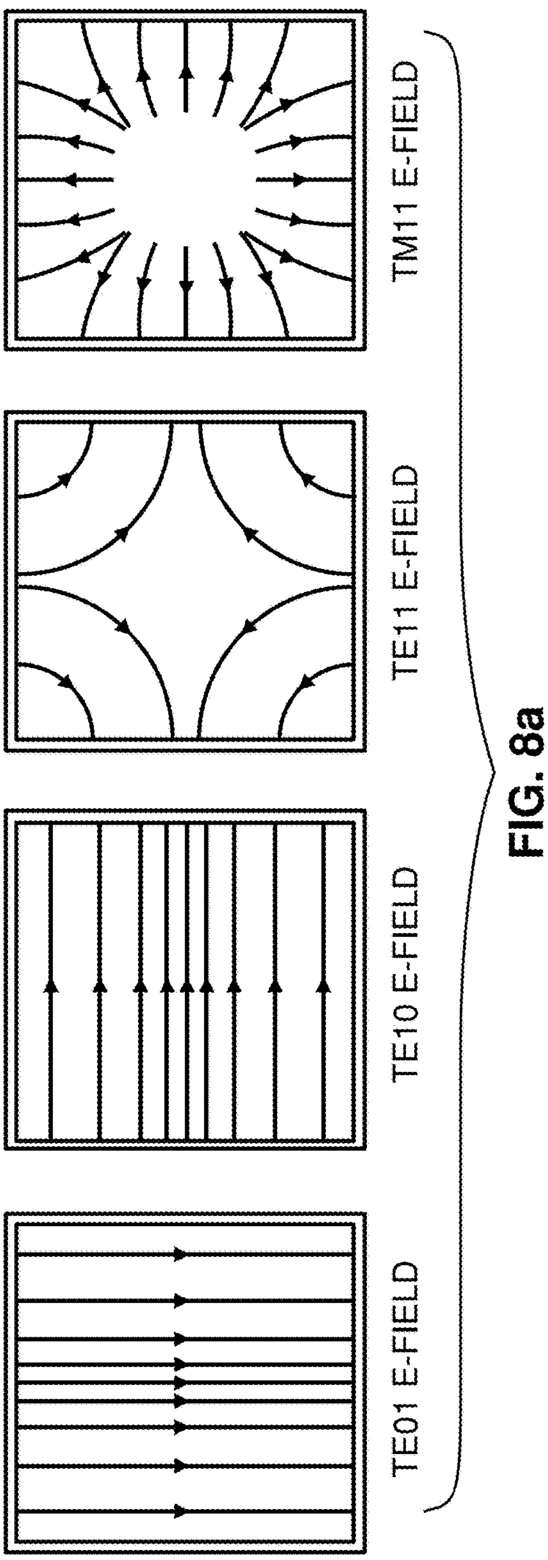
FIGS. 8*a* and 8*b* schematically show propagating waveguide modes at a septum polarizer common port and within the mode filter according to an embodiment of the present invention.
Figure 8B:
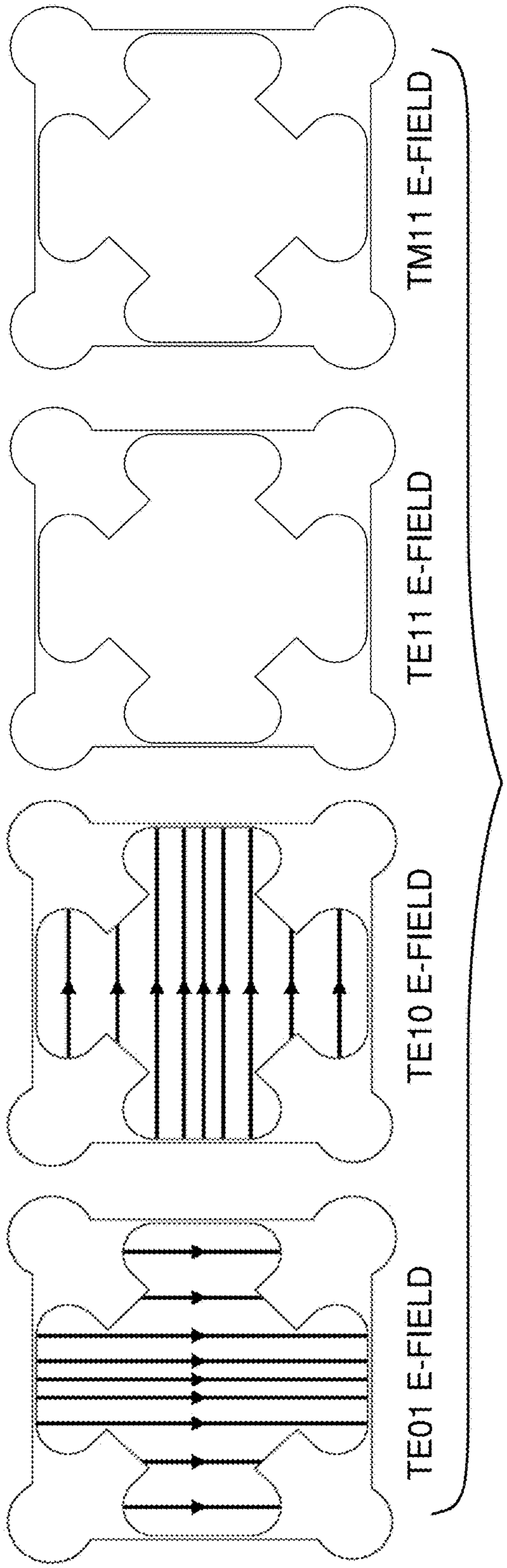

FIG. 8*a* shows the transverse electric field distribution of the fundamental mode of propagation (TE01, TE10) and of the higher order modes (TE11 and TM11) within a square waveguide that are generated at the output of the septum polarizer of the unit cell of an exemplary waveguide array antenna according to the present invention. FIG. 8*b* shows the transverse electric field distribution of the same modes propagating in the mode filter shown in FIGS. 7*a* and 7*b*. As can be seen, the mode filter advantageously rejects the higher order modes and allows only the fundamental mode to pass.

The grid of the present invention may be realized in waveguide technology as an array of waveguide apertures. According to embodiments of the present invention, the apertures may have a square, circular or polygonal (i.e. hexagonal or octagonal) shape. According to other embodiments of the present invention, the apertures may have a square quadridged, circular quadridged or polygonal quadridged shape.

Alternatively, the grid may be realized as a single or multi-layer PCB (Printed Circuit Board), where each layer is printed with an array of circular, square or, more generally, polygonal conductive loops.

FIGS. 9*a*, 9*b* and 9*c* show, respectively, a top view and two isometric views of a unit portion 900 of the grid of FIGS. 6*a* and 6*b*, in accordance with embodiments of the present invention. The grid shown in FIGS. 9*a*, 9*b* and 9*c* is realized in waveguide technology. The unit portion 900 of the waveguide grid schematically shown in FIGS. 9*a*, 9*b* and 9*c* comprises a cluster of waveguide apertures 910. The array of waveguide apertures has the function of subdividing the radiating elements of the antenna into an array of radiating sub-elements (in the embodiment schematically shown in FIGS. 9*a*, 9*b* and 9*c* each radiating element is subdivided into 2×2 radiating sub-elements) so as to minimise the inter-element distance and hence to minimise the grating lobes radiation. Each aperture of the grid preferably has a quadridged shape, which advantageously allows to maximise the bandwidth of the radiated signal and to minimise insertion loss and return loss. According to the embodiment shown in FIGS. 9*a*, 9*b* and 9*c* the quadridged apertures of the entire grid are preferably clustered in groups of four, each belonging to a single unit portion 900 of the grid.

Additionally, as already mentioned above, the grid is preferably suspended at a predefined distance above the array of radiating elements by means of an electromagnetic band gap (EBG) structure, which allows placing the grid at an optimal distance from the radiating elements in order to minimise insertion and return loss and to avoid grating lobes.

Hence, the EBG structure serves the dual purpose of structural support and prevention of side radiation from each of the radiating elements, thus further minimising losses and spurious radiation. It consists of a number of parallel, conductive pins protruding from the walls of the grid portions as it will be described herein below.

In particular, the structure supporting the grid 900 in the embodiment shown in FIGS. 9*a*, 9*b* and 9*c* comprises four pins 920 protruding from the walls of the unit portion 900 of the grid. Each pin 920 may be located at a position corresponding to the center of the respective wall. The pins 920 form, together with their periodic replicas, an EBG layer. According to the exemplary embodiment of the invention, the spacing D between the elements or replicas of the EBG layer (as indicated in FIG. 9*c*) is about 1.5 wavelengths at the highest frequency of operation. According to the same exemplary embodiment, the height H of each element (as indicated in FIG. 9*b*) may be equal to about ⅓ wavelength at the highest frequency of operation, while the size L of each element (as indicated in FIG. 9*b*) is preferably lower than ⅕ wavelength at the highest frequency of operation.

As mentioned herein above, such layer not only serves the purpose of providing the required separation between the radiating elements and the above grid but also contributes to limiting the radiation into unwanted regions of space, thus improving overall antenna efficiency. In particular, the inventor noticed that providing the EBG structure described above, as compared to an alternative approach such as providing metal walls, allows avoiding unwanted resonances. Additionally, the EBG structure advantageously removes any wave travelling parallel to the apertures of the radiating elements. As compared to providing dielectric spacers (e.g. foam), the EBG structure does not require tuning nor increases losses or excites unwanted resonances. Indeed, a dielectric spacer would have the disadvantage of requiring accurate tuning of its thickness for each production unit, as different batches may have slightly different dielectric constants. Moreover, it would cause additional losses and side radiation, which, in principle, can be avoided by adding metal walls that however may cause unwanted resonances.

It is to be appreciated that, according to embodiments of the present invention, the grid and the associated EBG structure described above may be configured to subdivide each radiating element in 2×2 (as shown in FIGS. 9*a*, 9*b* and 9*c*), 3×3 or, more generically, N×N radiating sub-elements, where N is an integer number higher than 3. This allows covering several operating bands of frequency separated far apart.

Figure 10:
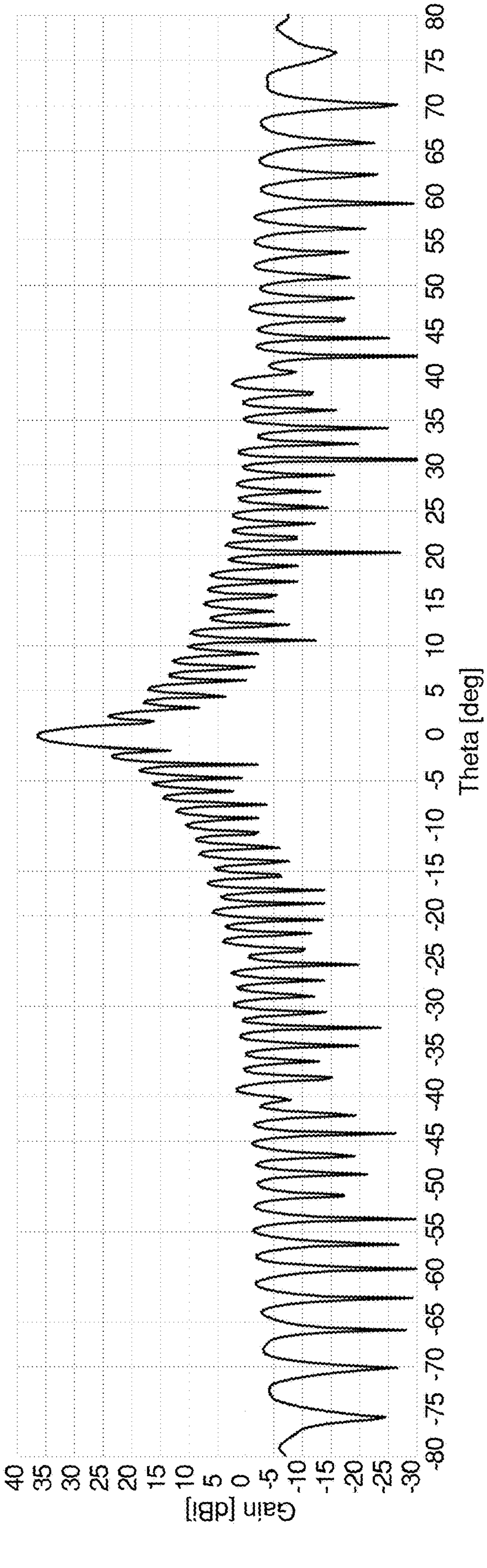
FIG. 10 shows a measured radiation pattern for an exemplary antenna according to the present invention.

FIG. 10 shows a measured radiation pattern at 30 GHz for an exemplary waveguide array antenna according to the present invention, such as the antenna shown in FIGS. 4*a* and 4*b*. As can be seen from the graph, the grating lobes are substantially absent. The inventor estimated that the residual grating lobes that can be seen around ±40° would have been approximately 10 dB to 15 dB higher in the absence of the grid and the mode filter. Such grating lobes would have caused the EIRP spectral density allowed by the satellite operator to be reduced proportionally therefore requiring the end user to lease more bandwidth in order to achieve the same satellite link performance.

The invention claimed is:

1. A waveguide array antenna for satellite communications, the waveguide array antenna being configured to transmit and/or receive a first polarization signal and a second polarization signal, the second polarization being orthogonal to the first polarization, and comprising an array of unit cells, plural unit cells of the array of unit cells comprising a radiating element, said waveguide array antenna further comprising: a grid configured to divide the radiating element into a number of radiating sub-elements having an inter-element distance that is lower than or equal to a wavelength at a highest frequency of operation of the waveguide array antenna; and an electromagnetic band gap layer configured to support said grid above the radiating element; wherein said grid comprises a number of grid unit portions, wherein said electromagnetic band gap layer comprises a number of pins protruding from walls of each of the grid unit portions wherein each unit cell of the array of unit cells further comprises a mode filter connected to the radiating element, said mode filter being located below the radiating element and being configured to pass a fundamental mode of propagation of said first polarization signal and said second polarization signal and to reject higher order modes of propagation; and wherein said mode filter comprises a center portion and two end portions at two sides of the center portion, wherein the center portion comprises a waveguide having a cross section with a Malta Cross shape, and wherein each of the two end portions has a form of a square waveguide comprising hollow cylindrical elements at corners of the square waveguide.

2. The waveguide array antenna according to claim 1, wherein said grid comprises an array of waveguide apertures positioned above the radiating element.

3. The waveguide array antenna according to claim 2, wherein each waveguide aperture of the array of waveguide apertures has a quadridged shape.

4. The waveguide array antenna according to claim 1, wherein the radiating element is a stepped horn.

5. The waveguide array antenna according to claim 1, wherein said waveguide array antenna further comprises a first diplexer and a second diplexer, the first diplexer being configured to separate a first polarization transmission signal and a first polarization reception signal and the second diplexer being configured to separate a second polarization transmission signal and a second polarization reception signal, the waveguide array antenna further comprising one or more beamforming networks connecting the first diplexer and the second diplexers with the plural unit cells of the array of unit cells.

6. The waveguide array antenna according to claim 5, wherein said waveguide array antenna further comprises a discrete polarizer interposed between the first diplexer and the second diplexers and the one or more beam forming networks.

7. The waveguide array antenna according to claim 1, wherein said each unit cell of the array of unit cells further comprises a polarizer, said polarizer being a septum polarizer or an orthomode polarizer.

8. The waveguide array antenna according to claim 1, wherein said waveguide array antenna comprises a distributed aperture polarizer positioned above the grid.

9. The waveguide array antenna according to claim 1, wherein the waveguide array antenna is configured to operate between 19.2 GHz and 21.2 GHz in reception and between 29 GHz and 31 GHz in transmission.

10. The waveguide array antenna according to claim 1, wherein said waveguide array antenna is manufactured as a layered assembly comprising a radiating layer comprising the radiating element and a grid layer comprising said grid and an electromagnetic band gap structure, wherein said radiating layer and said grid layer are made to include metal by using a computerized numerical control machining technology.

11. An antenna system for satellite communications, said antenna system being configured to be installed at a fixed location or on a land vehicle or on a vessel or on an aircraft, said system comprising a waveguide array antenna according to claim 1, a radome, a positioner and a housing for an antenna control unit.

12. The waveguide array antenna according to claim 1, wherein the plural unit cells of the array of unit cells comprises plural radiating elements, and wherein said waveguide array antenna is manufactured as a layered assembly comprising a radiating layer comprising the plural radiating elements and a grid layer comprising said grid and an electromagnetic band gap structure.

* * * * *